(No Model.)
O. HUFF.
SAW FOR SAWING CURVES OR IRREGULAR SHAPES.
No. 531,943. Patented Jan. 1, 1895.
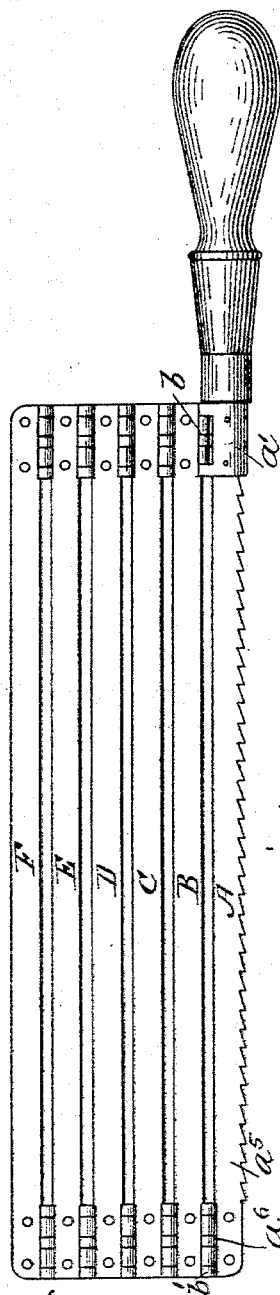
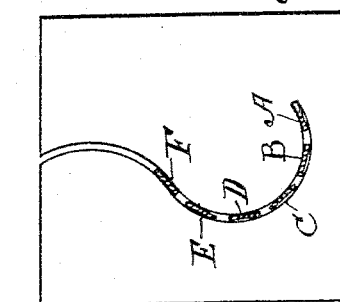
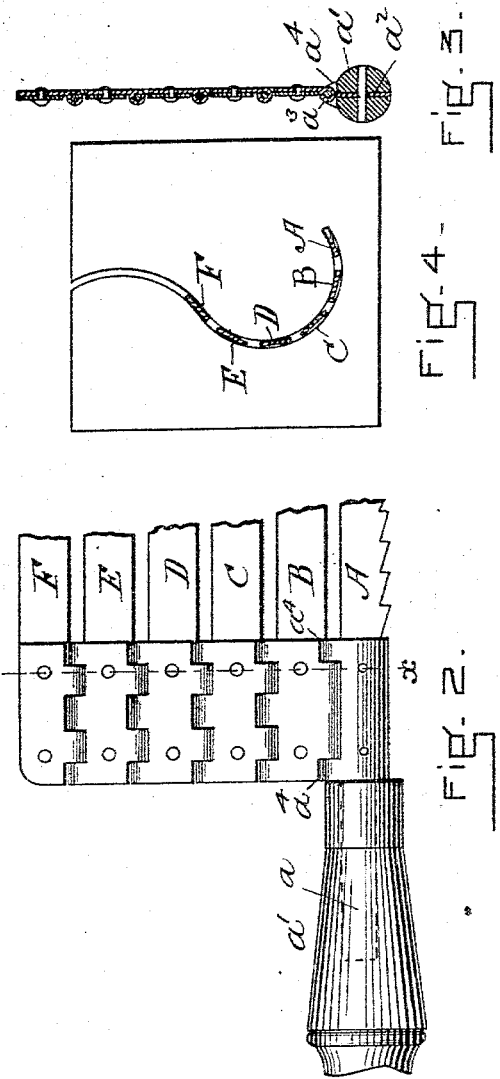
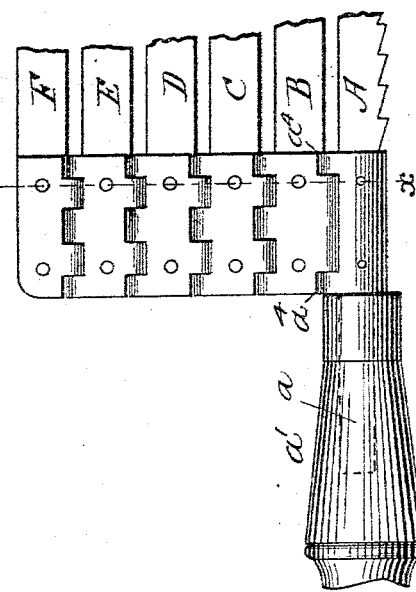
WITNESSES
E. L. Sherman.
Frank G. Parker.
INVENTOR
Orion Huff
by his Attys
Clarke & Raymond

UNITED STATES PATENT OFFICE.

ORISON HUFF, OF SOMERVILLE, ASSIGNOR TO FRANK E. WHITNEY, OF MELROSE, MASSACHUSETTS.

SAW FOR SAWING CURVES OR IRREGULAR SHAPES.

SPECIFICATION forming part of Letters Patent No. 531,943, dated January 1, 1895.

Application filed April 13, 1894. Serial No. 507,366. (No model.)

*To all whom it may concern:*

Be it known that I, ORISON HUFF, a citizen of the United States, residing at Somerville, in the county of Middlesex and State of Massachusetts, have invented a new and useful Improvement in Saws for Sawing Curves or Irregular Shapes, of which the following is a full, clear, and exact description, reference being had to the accompanying drawings, forming a part of this specification, in explaining its nature.

The invention relates to a saw which comprises the saw blade proper which must be relatively narrow and thin, in order that it may accomplish its purpose, and which is reinforced by thin, narrow reinforcing strips attached together and to the ends of the saw by hinges or a similar form of union, whereby they may have a movement independently of each other. The purpose of these strips is to provide stiffness to the saw blade and the purpose of making them narrow and joining them together in the manner described is to permit them to accommodate themselves to the curve or shape which is being sawed.

In the drawings:—Figure 1 is a view in elevation of a saw having the features of my invention. Fig. 2 is a detail view in elevation enlarged. Fig. 3 is a section on the dotted line of Fig. 2. Fig. 4 shows the saw in use.

Referring to the drawings: A represents the blade which forms the saw. It is narrow and thin and much resembles a section of a band saw. It is secured at its handle end to the handle $a$ in any desired way. I have represented it as so secured by means of a shank $a'$ having the recess $a^2$ extending from its under side of a depth to receive the blade of the saw, the shank and blade being riveted together and the shank having an extension to enter the handle and also a pin $a^3$ extending between the two lugs or ears $a^4$ to receive the section $b$ of the hinge to which the first stiffening blade B is riveted or otherwise attached.

The end $a^5$ of the saw has the hinge section $a^6$ attached to it, which receives the hinge section $b'$ at the corresponding end of the stiffening blade B and the stiffening blades C, D, E and F, each having at each end a hinge section which is united by a pin with the next hinge section in order, so that the various stiffening blades are secured together by joints or hinges at their ends, which permit them to be moved laterally or in either direction. See Fig. 4. Any form of connection which will permit the stiffening blades to have these movements in relation to each other and to the saw blade may be used.

Having thus fully described my invention, I claim and desire to secure by Letters Patent of the United States—

1. As an improved article of manufacture, the saw for sawing curves and irregular shapes, having a narrow saw blade and flexible stiffening blades jointed together at their ends and attached to the ends of the saw blade, as and for the purposes described.

2. The combination in a saw of the character specified, of the thin, narrow saw blade, its handle and one or more reinforcing or stiffening blades of narrow, thin metal, hinged or jointed to the ends of the saw blade and to each other as specified, as and for the purposes set forth.

3. The combination in a saw of the character specified, of the handle having the shank $a'$ provided with the recess $a^2$ to receive and hold one end of the saw blade A, also having the ears $a^4$ and cross-pin $a^3$ for the attachment of a hinge section, with the saw blade A, the hinge $a^6$ secured to its end $a^5$ and a stiffening or reinforcing blade B attached by hinged sections to the shank $a'$ and hinge $a^6$, as and for the purposes described.

ORISON HUFF.

Witnesses:
F. F. RAYMOND, 2d.,
J. M. DOLAN.